United States Patent
Chandler et al.

(10) Patent No.: US 10,034,328 B2
(45) Date of Patent: *Jul. 24, 2018

(54) SCANNING TALKGROUPS

(71) Applicant: IRIDIUM SATELLITE LLC, McLean, VA (US)

(72) Inventors: Garrett Chandler, Potomac Falls, VA (US); Daniel Tillet, Oak Hill, VA (US); Josh Miner, Herndon, VA (US); Luis Jordan, Charles Town, WV (US)

(73) Assignee: IRIDIUM SATELLITE LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/796,212

(22) Filed: Oct. 27, 2017

(65) Prior Publication Data

US 2018/0070387 A1     Mar. 8, 2018

Related U.S. Application Data

(63) Continuation of application No. 15/349,184, filed on Nov. 11, 2016, now Pat. No. 9,807,805, which is a continuation of application No. 14/577,357, filed on Dec. 19, 2014, now Pat. No. 9,525,982.

(51) Int. Cl.
| | |
|---|---|
| *H04B 7/00* | (2006.01) |
| *H04W 76/45* | (2018.01) |
| *H04W 4/10* | (2009.01) |
| *H04W 48/16* | (2009.01) |
| *H04W 76/00* | (2018.01) |
| *H04M 1/725* | (2006.01) |

(Continued)

(52) U.S. Cl.
CPC ....... *H04W 76/45* (2018.02); *H04M 1/72522* (2013.01); *H04W 4/10* (2013.01); *H04W 48/16* (2013.01); *H04W 76/005* (2013.01); *H04W 76/023* (2013.01); *H04W 76/14* (2018.02)

(58) Field of Classification Search
None
See application file for complete search history.

(56) References Cited

U.S. PATENT DOCUMENTS

| | | |
|---|---|---|
| 6,301,263 B1 | 10/2001 | Maggenti |
| 6,366,782 B1 * | 4/2002 | Fumarolo ............... G08G 1/20 455/457 |
| 6,411,816 B1 | 6/2002 | McDonald et al. |

(Continued)

OTHER PUBLICATIONS

HomePatrol-1 Owner's Manual Version 2.02, Uniden America Corporation, dated Dec. 6, 2011.

*Primary Examiner* — Mohammed Rachedine
(74) *Attorney, Agent, or Firm* — Baker Botts L.L.P.

(57) ABSTRACT

An instruction to enter a scanning mode may be received at a communication device. The communication device may participate in several talkgroups. A determination may be made that at least one of the talkgroups is active. In response, the communication device may be set to a first active talkgroup. A determination may be made that a predetermined time has passed since the communication device was set to the first active talkgroup. In response, a determination also may be made that at least a second one of the talkgroups, other than the first active talkgroup, is active. In response, the communication device may be set to the second active talkgroup.

24 Claims, 6 Drawing Sheets

(51) Int. Cl.
*H04W 76/02* (2009.01)
*H04W 76/14* (2018.01)

(56) References Cited

U.S. PATENT DOCUMENTS

| | | |
|---|---|---|
| 6,842,609 B2 | 1/2005 | Davis |
| 7,676,192 B1 | 3/2010 | Wilson |
| 7,751,806 B1 | 7/2010 | Vu |
| 9,578,469 B2 * | 2/2017 | Ruelke ................. H04L 5/0016 |
| 9,615,261 B2 * | 4/2017 | Agulnik ................... H04W 4/90 |
| 9,661,144 B2 * | 5/2017 | Shahaf ................... H04M 3/568 |
| 2007/0082689 A1 | 4/2007 | Talty et al. |
| 2015/0148034 A1 | 5/2015 | Roussev et al. |

\* cited by examiner

US 10,034,328 B2

SCANNING TALKGROUPS

RELATED APPLICATIONS

This application is a Continuation of U.S. application Ser. No. 15/349,184, filed Nov. 11, 2016, which is a Continuation of U.S. application Ser. No. 14/577,357, filed Dec. 19, 2014, the entire contents of each of which are incorporated herein by reference.

TECHNICAL FIELD

The disclosure relates generally to Push-To-Talk communication, and more specifically to scanning talkgroups.

SUMMARY

According to an implementation of the disclosure, a method may include receiving, at a communication device, an instruction to enter a scanning mode. The communication device may be permitted to participate in a plurality of talkgroups. The method may include, in response to receiving the instruction to enter the scanning mode, determining that at least one of the plurality of talkgroups is active. Further, the method may include, in response to determining that at least one of the plurality of talkgroups is active, setting the communication device to a first active talkgroup of the plurality of talkgroups. The method also may include determining that a predetermined time has passed since the communication device was set to the first active talkgroup. In addition, the method may include, in response to determining that the predetermined time has passed since the communication device was set to the first active talkgroup, determining that at least a second one of the plurality of talkgroups, other than the first active talkgroup, is active. Further still, the method may include, in response to determining that the second talkgroup, is active, setting the communication device to the second active talkgroup of the plurality of talkgroups.

Other features of the present disclosure will be apparent in view of the following detailed description of the disclosure and the accompanying drawings. Implementations described herein, including the above-described implementation, may include a method or process, a system, or computer-readable program code embodied on computer-readable media.

BRIEF DESCRIPTION OF THE DRAWINGS

For a more complete understanding of the present disclosure, reference now is made to the following description taken in connection with the accompanying drawings.

DETAILED DESCRIPTION

Figure 1:
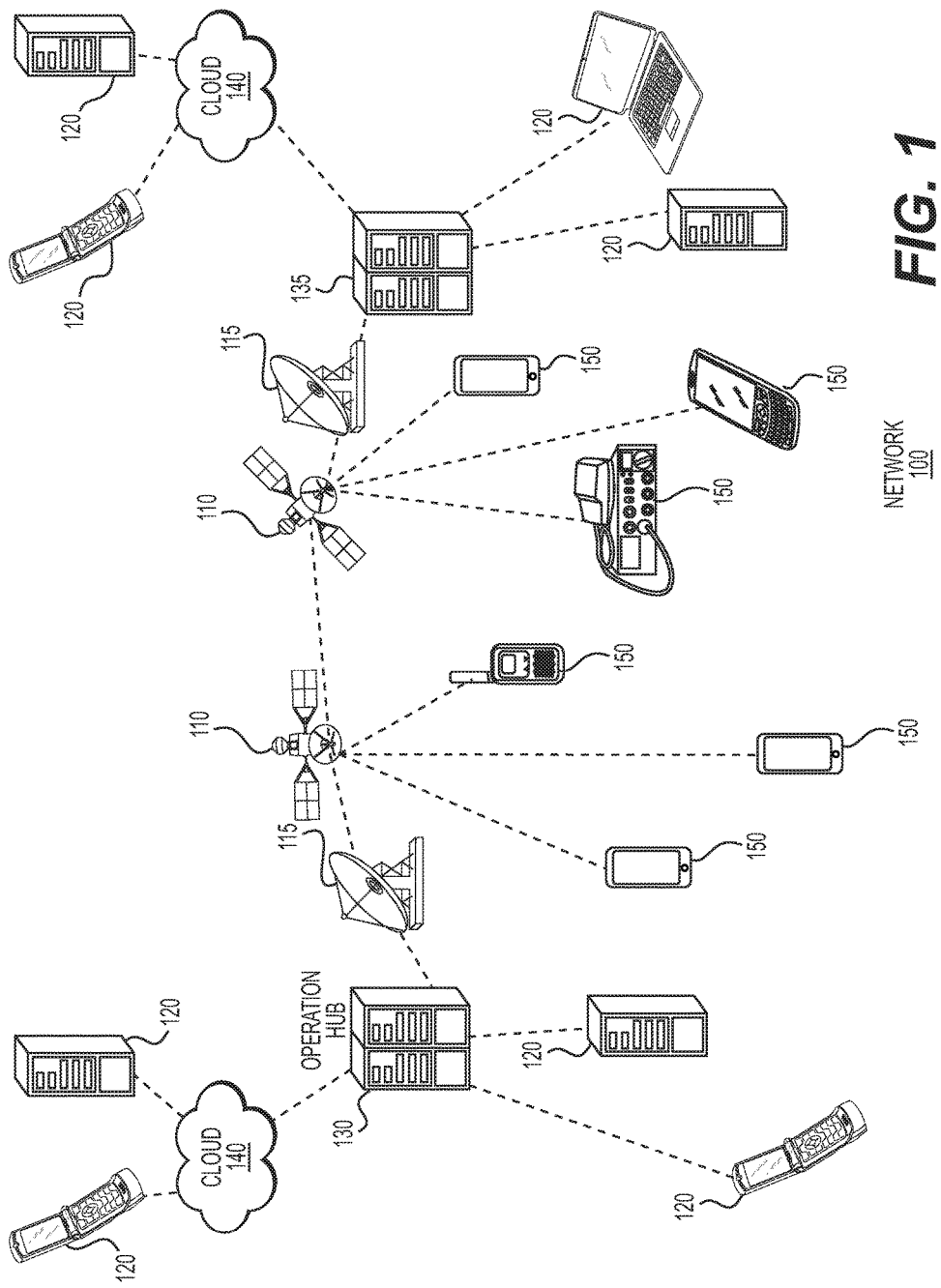
FIG. 1 is a block diagram of a network for satellite-based communications using one or more communication methods, in accordance with particular implementations of the present disclosure.

Aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in combinations of software and hardware that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of such a computer-readable storage medium include the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to satellite communications, wireless, wireline, optical fiber cable, RF signals, etc., or any suitable combination of the foregoing.

Computer program code for carrying out operations for aspects of the present disclosure may be written in any combination of one or more programming languages, including an object oriented programming language, such as JAVA, C++, C#, or other suitable programming languages. The program code may execute entirely on a user's device, partly on a user's device, as a stand-alone software package, partly on a user's device and partly on a remote computer, or entirely on a remote computer or server. In the latter scenario, a remote computer may be connected to a user's device through any type of network, including a satellite communications network, a local area network ("LAN"), or a wide area network ("WAN"), or the connection may be made to an external computer (for example, through the Internet using an Internet Service Provider) or offered as a service, such as, for example, a Software as a Service ("SaaS"), e.g., over a secure web interface via a https connection.

Aspects of the present disclosure are described herein with reference to flowchart illustrations and/or block diagrams of methods, apparatuses (including systems), and computer program products. Individual blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer-readable medium. When accessed from the computer-readable medium and executed, the computer program instructions may direct a computer, other programmable data processing apparatus, or other devices to function in a particular manner, such that the instructions when stored in the computer-readable medium produce an article of manufacture including instructions that, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring now to FIG. 1, a network 100 may facilitate communication between communication devices using one or more communication methods. Specifically, FIG. 1 illustrates a block diagram of a network for satellite-based communication using one or more communication methods. Network 100 may comprise a plurality of satellites 110, each of which may permit the exchange of information and services among devices that are connected via satellites 110. Network 100 may also comprise a plurality of satellite links 115 (e.g., earth-based satellite dishes, vehicle-based satellite dishes, high-power transmitters and receivers, antennas, earth terminals, teleports) that may be configured to communicate with the one or more satellites 110 and relay data back and forth with the one or more satellites 110. In certain implementations, network 100 may comprise a plurality of cross-linked satellites 110 that effectively form a network between satellites 110 across which communications can be transferred. In other implementations, for example, network 100 may comprise one or more satellites 110 and each such satellite 110 may not directly connect to another satellite 110. In such other implementations, each satellite 110 may have a "bent pipe" architecture in which satellites 110 may only connect indirectly with one another through terrestrial-based systems, for example.

In addition, network 100 may comprise one or more operation hubs 130 (e.g., a Network Operations Center ("NOC") and/or a gateway for interfacing the satellite-based portion of network 100 to one or more terrestrial-based portions of network 100) configured to connect to at least one of the plurality of satellites 110. An operation hub 130 may comprise one or more locations (e.g., devices) that may monitor, control, or manage network 100. Each operation hub 130 may manage and monitor one or more satellites 110. For example, operation hub 130 may control movement or positioning of a satellite 110, may receive and monitor communications between a satellite 110 and other devices, or may determine when satellite 110 needs maintenance. In some implementations, a dedicated operation hub 130 may be established for each satellite 110. Alternatively, in some other implementations, an operation hub 130 may manage and monitor a plurality of satellites 110. In such implementations, operation hub 130 may connect directly with only one satellite 110 that is within range for direct communication with operation hub 130 via satellite link 115, or possibly a few satellites 110 that are within range of satellite link 115, and operation hub 130 may indirectly manage and control other satellites 110 in network 100 through cross-linked communications between the satellite (or satellites) 110 within range of satellite link 115 and satellites 110 outside of the range for direct communication with operation hub 130 via satellite link 115.

In some implementations, one or more satellites 110 may maintain a geostationary orbit, and operation hub 130 may always directly communicate, via satellite link 115, with the same satellite 110 that always remains in a geostationary position within range for direct communication with operation hub 130 via satellite link 115, for example. In other implementations, one or more satellites 110 may not maintain a geostationary orbit, and operation hub 130 may directly communicate with different satellites 110 at different times based on which satellite 110 or satellites 110 are within range for direct communication with operation hub 130 via satellite link 115 at any given time.

Operation hub 130 may be connected to one or more clouds 140, which may be public clouds, private clouds, or community clouds. Each cloud 140 may permit the exchange of information and services among devices (e.g., operation hub 130) that are connected to such clouds 140. In certain implementations, cloud 140 may be a wide area network, such as the Internet. In some implementations, cloud 140 may be a local area network, such as an intranet. Further, cloud 140 may be a closed, private network in certain implementations, and cloud 140 may be an open network in other implementations. Cloud 140 may facilitate the transmission of information among users or devices (e.g., operation hub 130, devices 120) that are connected to cloud 140 through any number of communication means, such as wireless transmission of information or wired transmission of information, for example. Operation hub 130 may integrate signals or data from satellites 110 with terrestrial systems, such as cellular networks, the public switched telephone network (PSTN), and/or the Internet via cloud 140, for example.

One or more devices 120 may connect with operation hub 130. Such devices 120 and operation hub 130 may transmit data therebetween. Devices 120 may include, for example, one or more general purpose computing devices, specialized computing devices, mainframe devices, wired devices, wireless devices, monitoring devices, infrastructure devices, other devices configured to provide information to service providers and users, telephones, mobile phones, computer devices, tablet computers, personal digital assistants, routers, switches, and any other suitable communication device. In certain implementations, for example, a device 120 connected with operation hub 130 may function as a management center and may mange a plurality of talkgroups (described in more detail below) assigned to a plurality of devices, such as communication devices 150 (described below in more detail), or organizations. In such implementations, the device 120 may establish, for example, connection orders for such talkgroups, priority settings for such talkgroups, home settings for such talkgroups, security settings or keys for such talkgroups, or other protocols for talkgroups.

Network 100 may include a plurality of gateways 135. Gateways 135 may function similarly to operation hub 130, except that gateways 135 may not have rights to control satellites 110 or responsibilities to manage satellites 110. In certain implementations, gateways 135 may communicate with satellites 110 via satellite links 115. In other implementations, gateways 135 may utilize other methods requiring less infrastructure, such as low power antennas, transmitters, or receivers, to communicate with satellites 110. For example, gateways 135 may serve as bridges between satellites 110, cloud 140, and devices 120 and may permit the free (or controlled) flow of data therebetween.

Network 100 may include a plurality of communication devices 150. Similar to devices 120, communication devices 150 may include, for example, one or more general purpose computing devices, specialized computing devices, mainframe devices, wired devices, wireless devices, monitoring devices, infrastructure devices, other devices configured to provide information to service providers and users, telephones, mobile phones, computer devices, tablet computers, personal digital assistants, routers, switches, and any other suitable communication device. Communication devices 150 may be configured to collect data from or provide data to one or more data sources (e.g., servers, networks, interfaces, other devices). For example communication devices 150 may collect information from network 100, operation hub 130, satellite link 115, satellites 110, and other devices connected to satellites 110, such as other communication devices 150. By collecting this information, communication devices 150 may perform one or more tasks associated with talkgroups, as discussed in more detail below, and other communication methods.

More particularly, communication devices 150 may establish direct communication with satellites 110 orbiting above their terrestrial positions. Accordingly, communication devices 150 may utilize satellites 110 to establish communication with other communication devices 150, with operation hub 130, with cloud 140, with devices 120, with gateway 135, and with any other suitable device or system. Communication devices 150 may include features similar to those of devices 120 and may similarly communicate with operation hubs 130 and gateways 135 in certain implementations.

Network 100 may be configured to facilitate Push-To-Talk ("PTT") communication. PTT communication is a method of communicating that, in some implementations, uses half-duplex communication lines in which a communication device, such as a communication device 150, switches between a dedicated transmission mode and a dedicated reception mode, for example, for the purposes of communicating with one or more other communication devices that collectively may be referred to as a talkgroup. In some implementations of PTT communication, the communication device may be in the dedicated reception mode by default and may switch to the dedicated transmission mode only while a "talk" button is pushed or otherwise activated. In other implementations of PTT communication, the communication device may switch from the dedicated reception mode to the dedicated transmission mode in response to a first trigger, such as the selection of the dedicated transmission mode on the communication device, the detection of a particular sound (e.g., a user's voice, a particular word or command, a particular tone), or the receipt of any other instruction or command to switch to the dedicated transmission mode, and the communication device may remain in the dedicated transmission mode until a second trigger occurs and the communication device switches to the dedicated reception mode in response thereto. For example, the second trigger may include the selection of the dedicated reception mode on the communication device, the lapse of a particular period of time (e.g., 30 seconds, 1 minute, 5 minutes, 30 minutes, 1 hour) in the dedicated transmission mode, the absence of a particular sound (e.g., the user's voice), the detection of a particular sound (e.g., a particular word or command, a particular tone), or the receipt of any other instruction or command to end the dedicated transmission mode or to switch to the dedicated reception mode. In some instances, when a communication device is in the dedicated transmission mode, the device may be said to "have the floor" of the talkgroup.

Throughout this disclosure, PTT communications and communications more generally are described often in the context of voice communications. However, the systems and techniques described herein are not limited to communications involving voice. Rather, the systems and techniques described herein, and particularly the talkgroup scanning functionality, are more generally applicable to all forms of communication, including data communication. In fact, in some implementations, the communication devices engaging in PTT communications may not be user devices such as handsets and the like, but instead may be machine-to-machine ("M2M") or other data communication devices that, for example, generally may be referred to as facilitating the "Internet of Things" ("IoT"). For instance, the communication devices may interface with sensors or other types of data processing and/or generating devices and may be configured to participate in PTT communication sessions, for example, involving one or more other communication devices, to share data. In such implementations, the communication devices still may exchange data with other communication devices within a talkgroup using PTT techniques, and the communication devices still may employ the talkgroup scanning techniques described herein. Furthermore, while the term "PTT" or "push-to-talk" may suggest that something (e.g., a button) must be "pushed" (and, in some cases, held) in order for a communication device to "take the floor" or otherwise communicate in a dedicated transmission mode in a talkgroup, that is not necessarily the case. As described herein, there are various other mechanisms through which communication devices can "take the floor" or otherwise communicate in a dedicated transmission mode in a talkgroup, particularly in implementations where the communication devices are not user devices but instead are M2M or other data communication devices.

PTT communication may facilitate communication between a plurality of devices, such as communication devices 150, by establishing communication protocols that govern which communication device 150 "has the floor"

(e.g., is set to a dedicated transmission mode) and which communication device or devices 150 are listening (e.g., are set to the dedicated reception mode). Consequently, PTT communication may efficiently allocate communication roles (e.g., either being in a dedicated transmission mode or being in a dedicated reception mode) among a group of communication devices 150.

In some PTT implementations, approaches other than or in addition to half-duplex communication lines may be used. For example, some implementations of PTT communication may utilize two-way (or full) duplex communication lines in which a plurality of communication devices 150 may simultaneously be in transmission modes. In such alternative implementations, for example, users of a plurality of communication devices 150 may speak simultaneously and may all be heard by users of other communication devices 150 connected with the speaking users.

In PTT communication, communication may occur via one or more traffic channels. A traffic channel may correspond to an electromagnetic wave, such as a radio wave, of a particular frequency. A plurality of communication devices may connect to one or more traffic channels. In particular, a communication device set to the dedicated transmission mode and connected to a particular traffic channel may transmit a communication over the traffic channel, e.g., by transmitting an electromagnetic wave at the frequency corresponding to the traffic channel, to communication devices set to the dedicated reception mode or network nodes (e.g., a satellite 110) connected to the traffic channel. For example, a user may speak into a first communication device set to the dedicated transmission mode and connected to the traffic channel; the first communication device may encode the user's message in a radio signal and transmit the radio signal over the traffic channel; one or more second communication devices set to the dedicated reception mode and connected to the traffic channel may receive the radio signal, including the encoded message, over the traffic channel; and the one or more second communication devices may output the user's message in the user's voice to the respective users of the one or more second communication devices. In this manner, a communication device set to the dedicated transmission mode and connected to the traffic channel may transmit a communication (e.g., a voice communication, Morse code, a data packet) simultaneously to all (or some subset of all) other communication devices set to the dedicated reception mode and connected to the traffic channel. As described below in more detail, PTT communication may utilize talkgroups, which function similar to the traffic channels described above but allow communication between communication devices set to a plurality of different traffic channels.

In some implementations of PTT communication, only one communication device per traffic channel may be set to the dedicated transmission mode at a time. Consequently, if a communication device connected to a traffic channel is set to the dedicated transmission mode, the other communication devices connected to the traffic channel may not switch to the dedicated transmission mode until the communication device set to the dedicated transmission mode is switched to the dedicated reception mode or otherwise deactivated, even if a first trigger for switching one of the other communication devices to the dedicated transmission mode occurs. For example, if pushing a particular button on a particular communication device is the first trigger for switching the particular communication device to the dedicated transmission mode, in such an implementation, pushing the particular button may not switch the particular communication device to the dedicated transmission mode until after the communication device currently set to the dedicated transmission mode is switched to the dedicated reception mode or otherwise deactivated. In some implementations, when a first trigger for switching one of the other communication devices to the dedicated transmission mode occurs, the first trigger may also serve as a second trigger for switching the communication device currently in the dedicated transmission mode to the dedicated reception mode, which may allow one of the other communication devices to switch to the dedicated transmission mode.

PTT communication also may utilize a control channel that may carry information about each of a plurality of traffic channels. The control channel may correspond to an electromagnetic wave, such as a radio wave, of a dedicated frequency. The control channel may provide a data stream including, for example, information about one or more of the available traffic channels or about the traffic channels in aggregate. Such information may include, for example, the number of available traffic channels and the frequencies of available traffic channels. Alternatively or additionally, the data stream may include information about communication devices associated with the one or more available traffic channels including, for example, the number of communication devices connected to or waiting for each traffic channel, the types of communication devices connected to or waiting for each traffic channel, the length of time one or more communication devices have been connected to each traffic channel, whether a communication device connected to a particular traffic channel is set to the dedicated transmission mode, which communication device is currently set in a dedicated transmission mode on a particular traffic channel, the length of time a communication device has been set in a dedicated transmission mode on a particular traffic channel, the length of time a particular traffic channel has been active (e.g., an aggregate length of time that one or more communication devices have been set in a dedicated transmission mode on a particular traffic channel), which communication device is currently set in a dedicated reception mode on a particular traffic channel, whether each traffic channel is available, and other information about the communication devices connected to the traffic channels.

In implementations of PTT communication utilizing talkgroups, the control channel data stream may include information including, for example, information identifying whether a traffic channel is assigned to a talkgroup, information identifying traffic channels assigned to particular talkgroups, and other information about the traffic channels and any talkgroups to which traffic channels are assigned. Such information may allow communication devices to connect with or remain connected to talkgroups as the frequencies or traffic channels associated with the talkgroups are reallocated and as the communication devices move relative to satellites 110 (or as satellites 110 move relative to the communication devices) and the respective beams thereof, which may, for example, result in handoffs being made between beams, satellites, etc.

As described below in more detail, talkgroups may be characterized as either active talkgroups (sometimes referred to as "live" talkgroups) or inactive talkgroups (sometimes referred to as "dead" talkgroups). For example, active talkgroups may be talkgroups on which active communication is currently occurring (e.g., a user is currently speaking into a communication device connected to a talkgroup and the communication device is transmitting the spoken audio in a dedicated transmission mode) or on which active communication has occurred within a particular period of time. Similarly, inactive talkgroups may be talkgroups on which active communication is not currently occurring (e.g., no communication devices are connected to the talkgroup and transmitting in a dedicated transmission mode) or on which active communication has not occurred within a particular period of time.

In some instances, a talkgroup may be determined to be active even if active communication (e.g., speaking) is not currently occurring (or has not occurred within the particular period of time) within the talkgroup. For example, communication devices may determine whether a talkgroup is active or inactive based on information from the control channel indicating whether one or more traffic channels are currently allocated to the talkgroup (or have been allocated to the talkgroup) within the particular period of time, rather than determining whether active communication is actually occurring (or has occurred within the particular period of time). For example, if control channel 0 provides information indicating that traffic channel 1 is currently allocated to talkgroup A or has been allocated to talkgroup A within a particular period of time (e.g., within the last 10 seconds), then a communication device 150 listening to control channel 0 may determine that talkgroup A is an active talkgroup. Alternatively, if control channel 0 provides information indicating that no traffic channels are currently allocated to talkgroup A or that no traffic channels have been allocated to talkgroup A within the particular period of time, then a communication device 150 listening to control channel 0 may determine that talkgroup A is an inactive talkgroup.

In some implementations, traffic channels may be allocated to a talkgroup in response to a request from a communication device provisioned to participate in the talkgroup. For example, if the talkgroup is inactive, no traffic channels may be currently allocated to the talkgroup. In response to a communication device that is provisioned to participate in the talkgroup requesting to participate in the dedicated transmission mode, one or more traffic channels may be allocated to the talkgroup to enable communications over the talkgroup. Thereafter, traffic channel(s) may be maintained for the talkgroup until no devices provisioned to participate in the talkgroup have participated in the talkgroup in the dedicated transmission mode for more than some defined threshold period of time. After the defined threshold period of time elapses with no device provisioned to participate in the talkgroup having participated in the talkgroup in the dedicated transmission mode, the traffic channel(s) allocated to the talkgroup may be torn down and the talkgroup may transition back to an inactive status.

In some implementations, data transmitted in the control channel may explicitly define whether a talkgroup is active or inactive. For example, in some implementations, a centralized entity (e.g., operation hub 130) may determine whether a talkgroup is active or inactive (e.g., based on whether active communication is occurring or has occurred within a defined period of time within the talkgroup) and transmit an indication of whether the talkgroup is active or inactive within the control channel.

A plurality of talkgroups may be available to particular communication devices or users. For example, available talkgroups for particular communication devices or users may be provisioned by operation hub 130, gateway 135, or a device 120 based on the communication devices' or users' affiliation with an organization. As an example, one set of available talkgroups may be provisioned for users or devices affiliated with a particular branch or division of the U.S. military, while another set of available talkgroups may be provisioned for a petroleum prospecting company, and still another set of available talkgroups may be provisioned for employees or aircraft of an airline. Each set of available talkgroups may include talkgroups that only are accessible (e.g., available) to devices or users associated with the organization to which the respective set of available talkgroups was provisioned. Relatedly, each device or user associated with a particular organization to which a set of available talkgroups has been provisioned only may be granted access to a subset of less than all of the available talkgroups provisioned for the particular organization. Nevertheless, in some implementations, multiple different sets of available talkgroups may utilize common beams and/or traffic channels, but utilization of the beams and/or traffic channels may be dynamically allocated such that each individual set of available talkgroups remains accessible only to devices or users associated with the organization to which the individual set of available talkgroups was provisioned. Further, in some implementations, each set of available talkgroups may be affiliated with one or more control channels that carry information about such available talkgroups. In other implementations, certain talkgroups may only be available using a particular access code, for example.

A plurality of communication devices may connect to a control channel, and the data transmitted in the control channel may enable each communication device of the plurality of communication devices (or each user thereof) to select a traffic channel to which such communication device may connect and to determine whether such communication device may be switched to the dedicated transmission mode at a particular instant in time. In some implementations, the traffic channel may even provide commands or assignments for particular communication devices to connect with particular traffic channels, such as when a "go to priority" or "go to favorite" feature is activated as discussed below. Further, the control channel or a similar channel may be used for establishing a connection between a first set of one or more communication devices and a second set of one or more communication devices through the Internet or another data network.

In some implementations, communication devices may continuously monitor the control channel. In other implementations, communication devices may selectively or periodically access the control channel, such as when a setting is changed or requested to be changed in the communication device (e.g., changing or requesting to change between a dedicated transmission mode and a dedicated reception mode, changing or requesting to change between talk groups), when the communication device is activated or removed from a sleep or hibernation state, or at predetermined or specified intervals of time. In some implementations, the data in the control channel may be continuously transmitted (e.g., broadcast) to the connected communication devices. In other implementations, the data in the control channel may be periodically or intermittently transmitted (e.g., broadcast) to the connected communication devices. Additionally or alternatively, the data in the control channel may be transmitted (e.g., broadcast) to the connected communication devices in response to the occurrence of certain events, such as a new communication device connecting to the control channel or when a communication device is activated or switches between the reception mode and the transmission mode, for example.

In satellite-based implementations of PTT communication systems, satellite 110 may generate one or more beams or spot beams that enable the satellite to transmit and/or receive one or more different data signals within each beam.

Such beam(s) may create a footprint spanning a particular geographic region of the earth. The footprint may be based on the characteristics of a satellite 110's antenna, such as the antenna's gain pattern, transmission power, transmit and/or receive frequencies, and the efficiency or quality of the antenna, for example. In some implementations, the radius of the particular geographic region within the footprint of a particular beam may be about 400 km. In other implementations, the radius of the particular region may be substantially less than or greater than 400 km based on factors such as the transmission power associated with the particular beam and sources of interference (e.g., mountains, trees, buildings, electromagnetic radiation sources). In some implementations, each satellite 110 may transmit a plurality of beams toward the earth and each such beam may be directed to a different geographic region. Certain satellites 110 may move relative to the earth over time, such that the geographic regions within the footprints of the satellites' 110 beams also change over time. Other satellites 110 may be geostationary, and the geographic regions within the footprints of the satellites' 110 beams may remain fixed in time or at least fixed for periods of time. Moreover, some satellites 110 may be configured to direct one or more beams to cover different geographic regions or to change power characteristics, such that the size of the geographic regions within the footprint(s) of the beam(s) may change.

Each beam may include a plurality of carriers (e.g., channels, frequencies), for example. In some implementations, frequencies may be assigned within the full spectrum of the beam, and such frequencies may be shared by communication devices within the footprint of the beam. In other implementations, frequencies may be assigned within only a portion of the full spectrum of the beam. Each beam may include one or more control channels (e.g., control channel 0) and a plurality of traffic channels (e.g., traffic channels 1, 2, 3, and 4). Accordingly, the one or more control channels and the plurality of traffic channels included in a particular beam may be available to the communication devices within the footprint of the particular beam. In some instances, however, interference sources may prevent some communication devices within the footprint of the particular beam from accessing the one or more control channels and/or the plurality of traffic channels in the particular beam.

In some implementations, beams from different satellites may create footprints that overlap with one another. In such cases, each communication device in such an overlapping region may only receive information from one control channel at a time. Consequently, the communication devices may be configured to select between the control channels associated with overlapping beams based on certain criteria. Such criteria may include, for example, one or more of the relative strength of the signal received from each beam (e.g., there may be a preference to select the control channel corresponding to the beam with a higher strength), whether the strength of the control channel currently being monitored is less than or equal to a particular signal level (e.g., there may be a preference to stay connected with the current beam until the signal strength of the beam becomes too low), and a determination of whether the communication device is currently communicating with other communication devices within the footprint of one of the beams (e.g., there may be a preference to stay connected with the current beam to maintain uninterrupted communication with the other communication devices).

Figure 2:
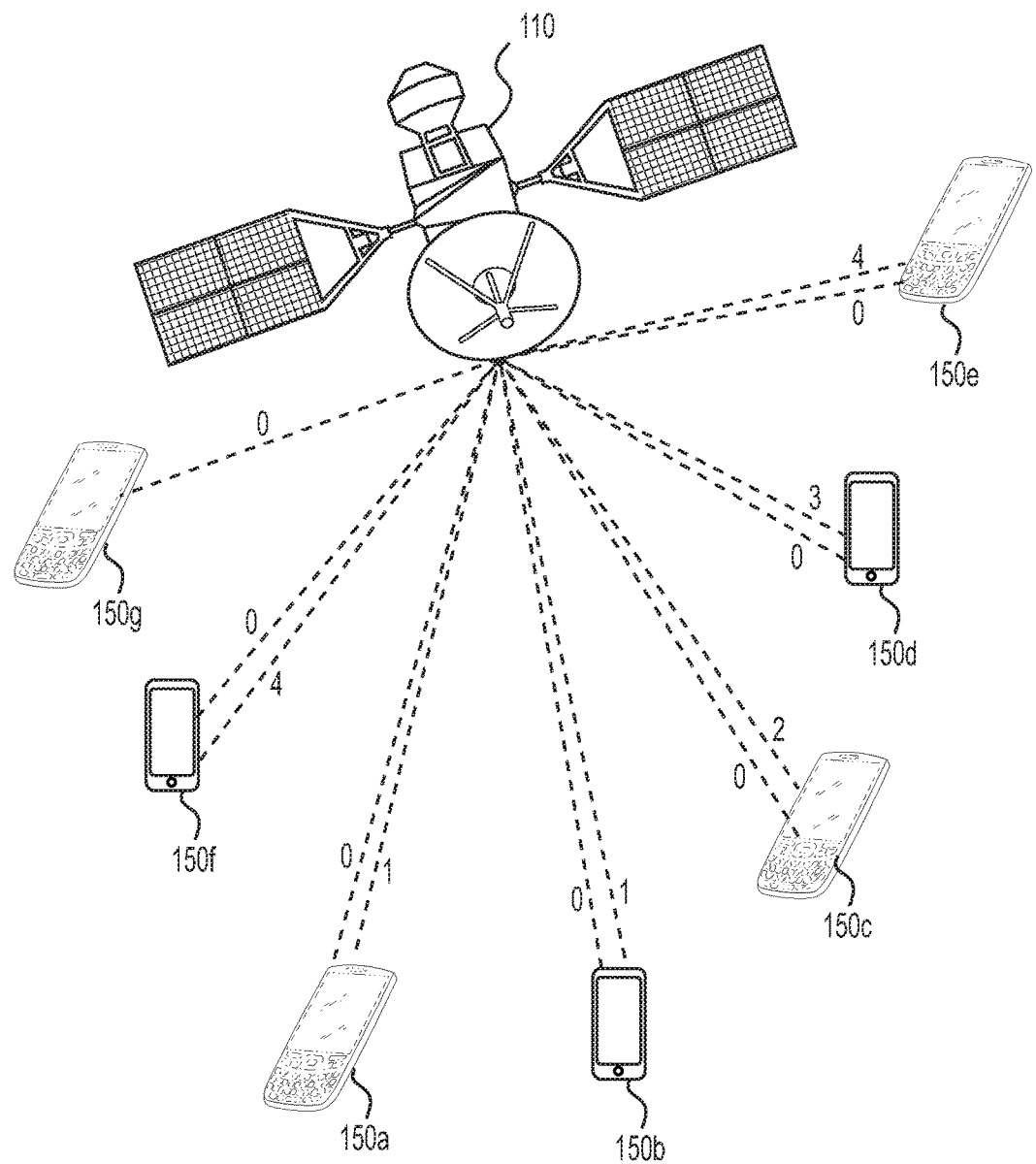
FIG. 2 is a schematic diagram showing a satellite-based implementation of a push-to-talk system, in accordance with particular implementations of the present disclosure.

FIG. 2 shows a schematic of one example of a satellite-based implementation of a PTT system. As shown in FIG. 2, each of communication devices 150 may monitor control channel 0. Some communication devices 150, such as communication devices 150*a* and 150*b*, may be set to transmit or receive communications via traffic channel 1. Other communication devices 150, such as communication device 150*c*, may be set to transmit or receive communications via traffic channel 2. Still other communication devices 150, such as communication device 150*d*, may be set to transmit or receive communications via traffic channel 3. Additional communication devices 150, such as communication devices 150*e* and 150*f*, may be set to transmit or receive communications via traffic channel 4. Certain communication devices 150, such as communication device 150*g*, may not be set to transmit or receive communications via any of traffic channels 1-4. Furthermore, the settings of communication devices 150*a-g* may be changed, such that one or more of communication devices 150*a-g* may be reset to transmit or receive communications via different ones of traffic channels 1-4 than those shown in FIG. 2.

In some implementations, communication devices may monitor the control channel to determine traffic channels that are available for a talkgroup (e.g., traffic channels without current communication activity such as connected devices or active communication transmissions from devices set in a dedicated transmission mode). When a communication device is set to a particular talkgroup, the communication device may either assign an available traffic channel to the particular talkgroup or identify a traffic channel currently assigned to the particular talkgroup. Thereafter, the communication device may begin transmitting or listening on the traffic channel assigned to the talkgroup set on the communication device.

Referring to FIG. 2, communication devices 150*a* and 150*b* may both be participating in the same talkgroup, for example. Moreover, each of communication devices 150*a*-150*g* may be provisioned to participate in a plurality of talkgroups, such that communication devices 150*a*-150*g* may switch back and forth between the different talkgroups within which they are provisioned to participate. For example, communication device 150*a* may be provisioned to participate in a talkgroup currently active on traffic channel 4 and, consequently, may switch into that talkgroup to communicate with communication devices 150*e* and 150*f*.

Figure 3:
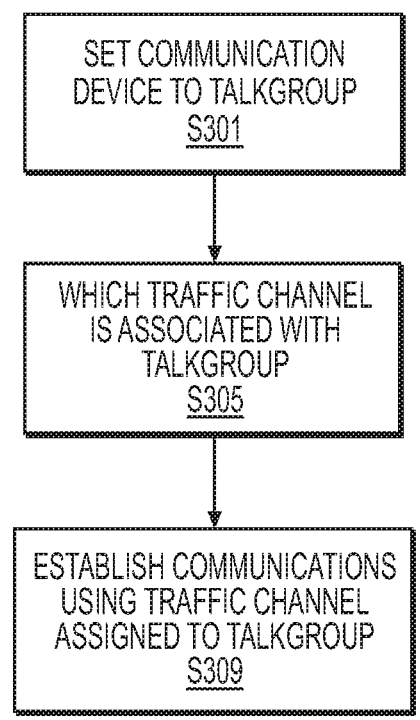
FIG. 3 is a flow chart illustrating a method for establishing communication via one or more talkgroups, in accordance with particular implementations of the present disclosure.

An example of a process of establishing communication via a talkgroup is shown in FIG. 3. In S301, a communication device may be set to a particular talkgroup, such as a talkgroup A, for example. Thereafter, in S305 the communication device may determine which traffic channel to use to connect the communication device to talkgroup A. For example, the communication device may analyze the information from a control channel, such as control channel 0, to determine if a traffic channel already has been assigned to talkgroup A (e.g., because other devices are currently connected to talkgroup A or communicating in talkgroup A). If a traffic channel already has been assigned to talkgroup A, the communication device may use the information from control channel 0 to determine which traffic channel is currently associated with talkgroup A. If a traffic channel has not already been assigned to talkgroup A, the communication device may request that a traffic channel be assigned to talkgroup A. After determining which traffic channel is associated with talkgroup A in S305, the communication device may connect to the assigned traffic channel in S309 and may begin transmitting or listening within talkgroup A.

Operation hub 130, gateway 135, or a device 120 may be responsible for associating a particular traffic channel with talkgroup A and transmitting this information out through control channel 0 to be received by communication devices 150, for example. Consequently, this information may be added to the control channel and the control channel may include information identifying the particular traffic channel assigned to talkgroup A. This information may be used by other communication devices when such communication devices perform S305 after being set to talkgroup A in S301.

Communication devices may disconnect from a talkgroup by switching to another talkgroup, entering a sleep or hibernation mode, or being deactivated, for example. Accordingly, once all of the devices previously connected to a particular talkgroup disconnect from the particular talkgroup or when no communication is currently being performed via the particular talk group (e.g., there are no devices transmitting in a dedicated transmission mode via the particular talkgroup or no devices have transmitted in a dedicated transmission mode via the particular talkgroup for a defined period of time), the traffic channel assigned to the particular talkgroup may become available for use by other talkgroups or for other communication methods. In some implementations, there may be a predetermined or selectable delay period between the time when all of the devices have disconnected from the particular talkgroup or the time when communication via the particular talkgroup has terminated and the time when the traffic channel assigned to the particular talkgroup becomes available for use by other talkgroups (e.g., 1 second, 5 seconds, 1 minute, 5 minutes). When a delay period exists, control channel 0 may also wait for the delay period before providing information that the traffic channel previously assigned to the particular talkgroup is available and that the particular talkgroup currently is not established.

In the manner described above, traffic channels may be dynamically allocated to talkgroups to efficiently reduce instances in which traffic channels are unused and to reduce the duration of such lack of use. As an additional benefit, frequently cycling talkgroups through different traffic channels may provide more secure and/or private communications than static traffic channels.

Users of PTT systems may desire to simultaneously monitor, participate in, and/or manage a plurality of talkgroups. In certain implementations of satellite-based and other PTT systems, such simultaneous monitoring, participation, and/or managing of talkgroups may be implemented by a management center. In such implementations, the management center may simultaneously listen to all talkgroups within the management center's responsibility (e.g., by simultaneously playing the audio signals being transmitted by all talkgroups).

As described above with reference to FIG. 2, communication devices may be provisioned to be able to participate in a plurality of different talkgroups. Accordingly, it may be advantageous for a communication device to automatically scan or cycle through multiple different talkgroups for which the communication device is provisioned to participate without requiring user interaction with the communication device to instruct the device to transition from talkgroup to talkgroup. For example, it may be advantageous for a communication device to automatically scan or cycle through those talkgroups for which the communication device is provisioned to participate that are currently active. Consequently, in some implementations of satellite-based and other PTT systems, communication devices may be configured to perform a scanning function. Such a scanning function may be activated when the communication device is set to a scanning mode, for example. In performing the scanning function, the communication device may initially set itself to the dedicated reception mode and to a particular talkgroup, such as talkgroup A. The communication device may remain set to the particular talkgroup for a predetermined or selected period of time (e.g., 1 second, 5 seconds, 1 minute, 5 minutes) to allow the communication device's user to listen for communication within the particular talkgroup. In certain implementations, the predetermined or selected period of time may be set by or changed by a user. In some implementations, the predetermined or selected period of time may be predefined and not configurable by the user. After the predetermined or selected period of time has lapsed, the communication device automatically may set itself to another talkgroup, such as talkgroup B, without any input from a user of the communication device and may remain set to the other talkgroup for the predetermined or selected period of time. After the predetermined or selected period of time has lapsed again, the communication device automatically may set itself to yet another talkgroup, such as talkgroup C. This scanning process may be iteratively and automatically repeated for all of the other talkgroups being monitored and/or managed by the user of the communication device. Further, once the scanning process has been repeated for all of the talkgroups being monitored and/or managed by the user of the communication device, the scanning process may be continuously repeated for all of the relevant talkgroups until the scanning process is terminated by a trigger, such as deactivation of the communication device, setting the communication device to a mode other than the scanning mode, or performing scanning for a predetermined or selected period of time, for example. The communication device may perform the above-described scanning function or process when set to a scan or scanning mode, for example.

While using a management center to simultaneously listen to all talkgroups within the management center's responsibility and/or using a communication device to scan all of the talkgroups being monitored and/or managed by the user of the communication device, as described above, may enable complete and (quasi-)simultaneous monitoring of all relevant talkgroups, significant resources (e.g., time, manpower, computational power) may be wasted monitoring talkgroups on which there is no activity (e.g., on which no communication is currently occurring). Moreover, in some instances, important activity within one talkgroup may be missed while resources are busy listening to another talkgroup without activity, such as, for example, during a scanning process in which the communication device remains set to a talkgroup without activity for the predetermined or selected period of time while activity is simultaneously occurring on another one of the other talkgroups.

Figure 4:
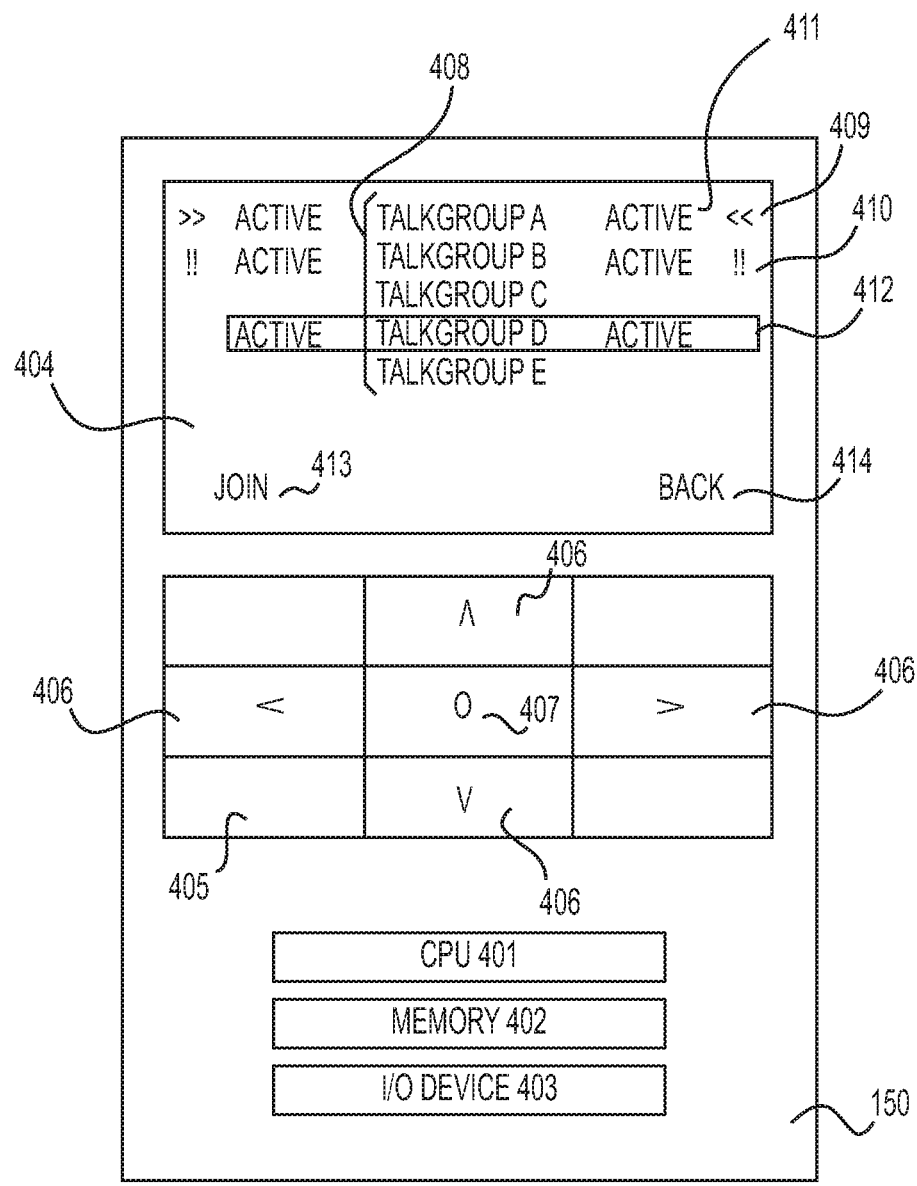
FIG. 4 is a block diagram of a communication device configured to implement a dynamic scanning process, in accordance with particular implementations of the present disclosure.

FIG. 4 shows a schematic illustration of a communication device 150 configured to implement one or more dynamic scanning techniques disclosed herein. Communication device 150 may include a central processing unit ("CPU") 401, a memory 402, an input or output ("I/O") device 403, a display device 404, and an operation device 405.

Memory 402 may store computer-readable instructions that may instruct CPU 401 to perform certain processes. Memory 402 may comprise, for example, RAM, ROM, EPROM, EEPROM, Flash memory, or any suitable combination thereof. When executed by CPU 401, the computer-readable instructions stored in memory 402 may instruct CPU 401 to operate as one or more devices configured to perform particular functions. In certain implementations, memory 402 may store computer-readable instructions for performing any and all functions or processes described herein, and CPU 401 may execute such computer-readable instructions and operate as one or more devices configured to perform or control such functions or processes.

Figure 5:
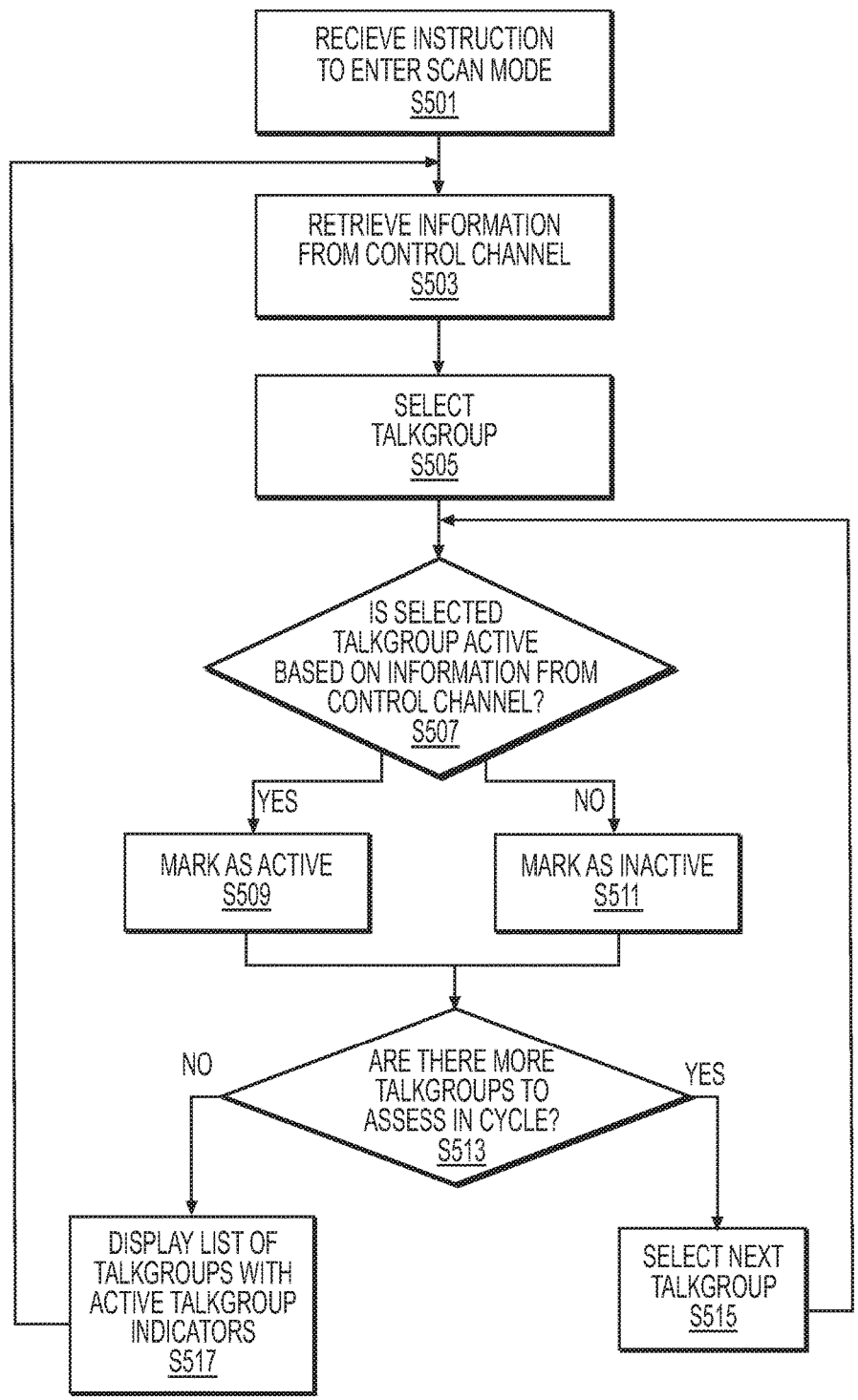
FIG. 5 is a flow chart illustrating a method for using information from a control channel to determine whether each of the talkgroups accessible to a communication device is active or inactive, in accordance with particular implementations of the present disclosure.
Figure 6:
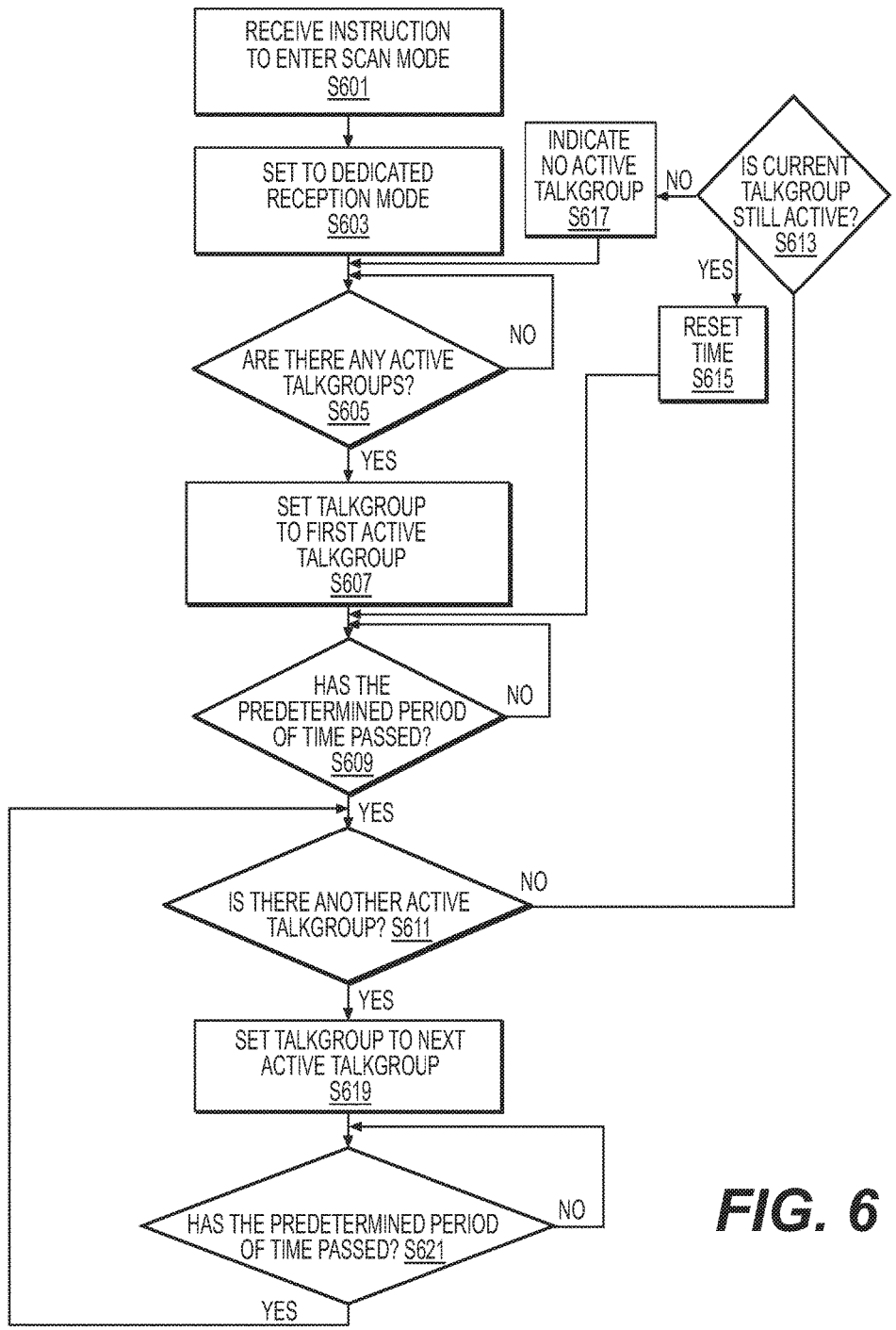
FIG. 6 is a flow chart illustrating a method for performing a dynamic scanning process, in accordance with particular implementations of the present disclosure.

CPU 401 may execute the computer-readable instructions stored in memory 402, and the computer-readable instructions may instruct CPU 401 to perform or control a plurality of processes including, but not limited to, one or more of the processes described with respect to FIGS. 3, 5, and 6 and any other process described herein. Accordingly, CPU 401 may be configured to perform a variety of processes, as discussed in more detail below. CPU 401 may be, for example, a processor, a controller, an application specific integrated circuit ("ASIC"), or a system comprising a plurality of processors, controllers, or ASICs.

I/O device 403 may receive one or more of data from network 100, data from one or more other devices connected to communication device 150, and input from a user and provide such information to CPU 401 and/or memory 402. I/O device 403 may transmit data to network 100, may transmit data to one or more other devices connected to communication device 150, and may transmit or otherwise render information to a user (e.g., display the information or indicators thereof, provide audible indications of such information). I/O device 403 may include, for example, one or more of a transceiver, a modem, a network card, a transmitter, a receiver, a microphone, a speaker, an antenna, a light-emitting diode ("LED"), a display device, or any other device configured to provide or receive information.

Display device 404 may be any device that may display information (e.g., to a user), such as, for example, a liquid crystal display, an organic LED display, a touchscreen, a projector, augmented reality glasses, or any other form of display configured to display information. As shown in FIG. 4, display device 404 may display a list of talkgroups 408 that communication device 150 may access (e.g., talkgroups that communication device 150 is provisioned to be able to access). In the example configuration shown in FIG. 4, the list of talkgroups 408 includes talkgroups A, B, C, D, and E. Nevertheless, the list of talkgroups 408 may include fewer talkgroups or additional talkgroups than shown in FIG. 4. In some implementations, the list of talkgroups 408 may not fit completely on display device 404, and a user may use operation device 405 to scroll to the other talkgroups in the list or to otherwise instruct display device 404 to display the remaining talkgroups.

Further, display device 404 may display one or more informational indicators associated with talkgroups in the list of talkgroups 408. Such informational indicators may include, for example, an indicator 409 indicating that a talkgroup (e.g., talkgroup A) is the home talkgroup for communication device 150 (as described in more detail below), an indicator 410 indicating that a talkgroup (e.g., talkgroup B) is the priority talkgroup for communication device 150 (as described in more detail below), an indicator 411 indicating that one or more talkgroups (e.g., talkgroups A, B, and D) are active, or an indicator 412 indicating that a particular talkgroup (e.g., talkgroup D) is currently selected (e.g., meaning that the particular talkgroup is the talkgroup in which communication device 150 presently is participating) or is indicated for selection.

Although represented by words and symbols in FIG. 4, each of indicators 409, 410, 411, and 412 may take the form of, for example, one or more of different shading, different colors, bold typeface, different typeface or font, different-sized typeface, identifying text (e.g., the word "ACTIVE"), or any other form of graphical or visual differentiation. For example, active talkgroups in the list of talkgroups 408 may be differentiated from inactive talkgroups in the list of talkgroups 408 by flashing the display of the active talkgroups in the list of talkgroups 408 on and off (e.g., according to some predefined duty cycle) while statically displaying inactive talkgroups in the list of talkgroups 408.

In some implementations, inactive talkgroups may be identified by informational indicators (not shown) instead of or in addition to active talkgroups being identified by informational indicators. For example, informational indicators for inactive talkgroups may include one or more of different shading, different colors, bold typeface, different typeface or font, different-sized typeface, identifying text (e.g., the word "INACTIVE"), flashing the display of the inactive talkgroups in the list of talkgroups 408 on and off (e.g., according to some predefined duty cycle), or any other form of graphical or visual differentiation. For example, active talkgroups in the list of talkgroups 408 may be differentiated from inactive talkgroups in the list of talkgroups 408 by different flashing patterns or distinctively different textual identifiers.

Display device 404 also may display a join button 413 and a back button 414. Join button 413 may be selected after selecting a talkgroup from the list of talkgroups 408 to set communication device 150 to the selected talkgroup. When back button 414 is selected, display device 404 may display previously-displayed content that may be different from the list of talkgroups 408 and indicators 409-412.

As shown in the example configuration of FIG. 4, indicator 409 indicates that talkgroup A is a home talkgroup. A home talkgroup may be a talkgroup that a particular set of users within an organization are encouraged to use to communicate when using network 100. For example, talkgroup A may be a talkgroup associated with emergency medical services in a particular city and talkgroup C may be a talkgroup associated with crime enforcement in the particular city. Accordingly, talkgroup A may be assigned as a home talkgroup for emergency medical responders who may be encouraged to use talkgroup A for communication. Similarly, talkgroup C may be assigned as a home talkgroup for police officers who may be encouraged to use talkgroup C for communication. In particular implementations, the emergency medical responders and police officers may freely utilize the other talkgroups, including talkgroups designated as the home talkgroup for other groups of users (e.g., police may communicate using talkgroup A). In some implementations, however, only the group of users to which a particular talkgroup is assigned as a home talkgroup may communicate using the particular talkgroup (e.g., in such implementations, police may not communicate using talkgroup A).

As shown in the example configuration of FIG. 4, indicator 410 indicates that talkgroup B is a priority talkgroup. Talkgroup B may be selected and used in a manner similar to talkgroups A and C-D. However, when Talkgroup B is activated by a communication device, other devices for which Talkgroup B has been assigned as a priority talkgroup, including, for example, communication device 150, may be triggered to connect to Talkgroup B (e.g., in dedicated reception mode), so that the user who activated Talkgroup B may transmit information to the other devices for which Talkgroup B has been assigned as the priority talkgroup.

In some implementations, the list of talkgroups 408 may include only active talkgroups, and inactive talkgroups may be omitted from the list of talkgroups 408 until such inactive talkgroups become active. In some implementations, the option to display only active talkgroups may be an option selectable by a user. In other implementations, only active talkgroups may be shown when communication device 150 is set to a certain mode, such as a scanning mode. In certain implementations, for example, communication device 150 may make a particular sound, or produce some other apparent notification when a talkgroup becomes active or inactive. Further distinctions between active and inactive talkgroups are described in detail below with respect to FIG. 5.

In certain implementations, communication device 150 may be set to a scanning mode. Such a scanning mode may, for example, cause communication device 150 to cycle through each talkgroup (or active talkgroup) that communication device 150 is provisioned to access. When communication device 150 is set to such a scanning mode, indicator 412 may indicate the talkgroup currently being monitored in the scanning process. After the predetermined or selected period of time ends and communication device 150 transitions to another active talkgroup within the scanning process, display device 404 also may change to indicate the new talkgroup being monitored with indicator 412.

Display device 404 also may display, for example, an indication of whether communication device 150 is in a dedicated reception mode, a dedicated transmission mode, or a scanning mode and/or an indication of whether communication device 150 is receiving or transmitting communications. Additionally or alternatively, display device 404 may display other content including a plurality of selection options, such as options for selecting one or more of: a scanning mode or function; a dedicated reception mode; a dedicated transmission mode; one or more "favorite" talkgroup or frequently-used talkgroups; a priority talkgroup; a home talkgroup; particular talkgroups to include in a scanning process; or other settings associated with talkgroups, associated with network 100, or associated with communication device 150. In particular implementations, display device 404 may display other talkgroup indicators, such as indicators indicating inactive talkgroups or favorite talkgroups. In some implementations, display device 404 may display other content (e.g., either with the list of talkgroups 408 similar to indicators 409-411 or separate from list of talkgroups 408) such as additional information from control channel 0 including, for example, the number of communication devices connected to one or more individual talkgroups, information about current or past communication devices set to the dedicated transmission mode in connection with one or more individual talkgroups, the length of time that individual talkgroups have been active or inactive, or other useful information associated with individual talkgroups.

In some implementations, operation device 405 may permit a user to physically input instructions into communication device 150, including selections of items on display device 404. As shown in FIG. 4, operation device 405 may include a plurality of buttons 406 and 407 that may be used to navigate (e.g., navigation buttons 406) and select (e.g., selection button 407) content displayed by display device 404. In addition or in alternative to navigation buttons 406 and selection button 407, operation device 405 may include dedicated function buttons, such as call buttons, end buttons, menu buttons, mode switch buttons, a scanning mode button, a reception mode button, or a transmission mode button, or character buttons, such as numbers, letters, punctuation marks, and other symbols that may be used to enter information or commands into communication device 150. In certain implementations, operation device 405 may include physical buttons that require depression, switching, flipping, sliding, turning, or some other mechanical operation. In some implementations, operation device 405 may include graphical buttons that may be activated by a touch sensor. In still other implementations, operation device 405 may be a touchscreen integrated directly within display device 404 that may allow a user to select content on display device 404 by touching (or otherwise interacting with) an area including or near the desired selection item.

In the example configuration shown in FIG. 4, a user may instruct communication device 150 to join or connect to a particular talkgroup by selecting the particular talkgroup and the join button 413 on display device 404 using operation device 405. The process of joining, connecting or otherwise enabling a communication device to participate in a particular talkgroup (e.g., in one or both of a dedicated transmission mode and a dedicated reception mode) may be referred to herein as setting the communication device to the particular talkgroup. Additionally or alternatively, in some implementations, the process of joining or connecting to a particular talkgroup may be performed by selecting the particular talkgroup on display device 404 and activating a dedicated join button on operation device 405. In other implementations, such as implementations in which operation device 405 is a touchscreen integrated directly within display device 404, a user may instruct communication device 150 to join or connect with a particular talkgroup by touching (or otherwise interacting with) an area including or near the desired talkgroup, in the list of talkgroups 408 for example. After the communication device has joined or connected to a particular talkgroup, a variety of different mechanisms may be available to enable the communication device to "take the floor," or enter the dedicated transmission mode, within the talkgroup. For example, in some implementations, the communication device may request to "take the floor," or enter the dedicated transmission mode, in response to the depression of a specified button on the communication device and may maintain in the dedicated transmission mode while the button remains depressed.

Examples of a dynamic scanning process performed by a device, such as communication device 150, now are disclosed with respect to FIG. 5 and FIG. 6.

FIG. 5 shows an example of a process of using information from a control channel to determine which talkgroups accessible to a communication device 150 (e.g., talkgroups that communication device 150 is provisioned to access) are active and which talkgroups accessible to a communication device 150 are inactive. In S501, CPU 401 may receive an instruction to enter a scanning mode. For example, a user of device 150 may interact with communication device 150 to input an instruction to enter the scanning mode. After receiving the instruction to enter the scanning mode, CPU 401 may retrieve information from a control channel, such as control channel 0, in S503. For example, in particular implementations, CPU 401 may retrieve information from control channel 0 indicating which, if any, talkgroups accessible to the communication device 150 are currently active. For instance, CPU 401 may retrieve information from control channel 0 indicating whether or not any other devices are communicating in a dedicated transmission mode on one or more of the talkgroups accessible to communication device 150. The retrieved information might indicate that other devices are currently communicating in a dedicated transmission mode in each of talkgroups A, B, and D, for example. As an alternative to retrieving information from control channel 0 indicating whether any other devices are communicating in a dedicated transmission mode on one or more of the talkgroups accessible to communication device 150, CPU 401 may retrieve information from control channel 0 indicating whether traffic channels are currently allocated to any of the talkgroups that are accessible to communication device 150.

In S505, CPU 401 may select one of the talkgroups accessible to communication device 150. For example, CPU 401 may select the first talkgroup included in the list of talkgroups (e.g., talkgroup A). Alternatively, CPU 401 could use some other criteria to pick the initial talkgroup in S505. CPU 401 subsequently proceeds to S507, in which CPU 401 determines whether the currently selected talkgroup is active or inactive based on the information retrieved from control channel 0. For example, in particular implementations, if talkgroup A is the currently selected talkgroup, CPU 401 may determine that talkgroup A is active if the information retrieved from control channel 0 in S503 indicates that a device is currently communicating in a dedicated transmission mode in talkgroup A. In contrast, CPU 401 may determine that talkgroup A is inactive if the information retrieved from control channel 0 in S503 does not indicate that a device is currently communicating in a dedicated transmission mode in talkgroup A. In alternative implementations of S507, CPU 401 may determine that the currently selected talkgroup is active (S507: Yes) if the information retrieved from control channel 0 in S503 indicates that a communication device has been continuously communicating in a dedicated transmission mode in the currently selected talkgroup for at least a predetermined length of time (e.g., a particular device has been transmitting on talkgroup A for at least 5 seconds), and may otherwise determine that the currently selected talkgroup is inactive. In other alternative implementations of S507, CPU 401 may determine that the currently selected talkgroup is active (S507: Yes) if the information retrieved from control channel 0 in S503 indicates that a plurality of devices in aggregate have been continuously communicating in a dedicated transmission mode in the currently selected talkgroup for at least a predetermined length of time (e.g., a first communication device and a second communication device have been transmitting on talkgroup A for at least an aggregate time of 5 seconds), and may otherwise determine that the currently selected talkgroup is inactive. In other implementations of S507, CPU 401 may determine that the currently selected talkgroup is active (S507: Yes) if the information retrieved from control channel 0 in S503 indicates that a communication device has communicated in a dedicated transmission mode in the currently selected talkgroup within a predetermined period of time (e.g., a particular device has transmitted on talkgroup A within the last 5 seconds), and may otherwise determine that the selected talkgroup is inactive. In still other implementations, CPU 401 may determine that the currently selected talkgroup is active (S507: Yes) if the information retrieved from control channel 0 in S503 indicates that a traffic channel is currently allocated to the currently selected talkgroup (or has been allocated to the currently selected talkgroup within a particular period of time), and may otherwise determine that the currently selected talkgroup is inactive.

If CPU 401 determines that the currently selected talkgroup is active (S507: Yes), CPU 401 may proceed to S509 and record the selected talkgroup as being active (e.g., by storing an indicator in memory 402 indicating that the selected talkgroup is active). On the other hand, if CPU 401 determines that the currently selected talkgroup is inactive (S507: No), CPU 401 may proceed to S511 and record the selected talkgroup as being inactive (e.g., by storing an indicator in memory 402 indicating that the selected talkgroup is inactive). After performing either of S509 and S511, CPU 401 may proceed to S513 and determine whether other talkgroups accessible to communication device 150 that have not been assessed as active or inactive during the current cycle remain. If CPU 401 determines that other talkgroups accessible to communication device 150 have not been assessed as active or inactive during the current cycle (S513: No), CPU 401 may proceed to S515 and select one of the talkgroups accessible to communication device 150 that has not yet been assessed in the current cycle. For example, if talkgroup A was previously selected in S505, assessed in S507, and marked in one of S509 and S511, talkgroups B-E may remain unassessed in the current cycle. Accordingly, CPU 401 may select one of talkgroups B-E in S515. As an example, CPU 401 may select talkgroup B because talkgroup B follows talkgroup A in the list of talkgroups 408. After S515, CPU 401 may return to S507 and compare the talkgroup selected in S515 with the information retrieved from control channel 0. Accordingly, processes S507-S515 may be repeated until all of the talkgroups that are accessible to communication device 150 have been assessed during the current cycle. When all of the talkgroups that are accessible to communication device 150 have been assessed as active or inactive during the current cycle (S513: Yes), CPU 401 may proceed to S517 and control display device 404 to display the list of talkgroups 408 with indicators 411 indicating which of the talkgroups available to communication device 150 are active. For example, after a cycle has concluded in which each of talkgroups A-E has been assessed as active or inactive and which resulted in talkgroups A, B and D being determined to be active while talkgroups C and E were determined to be inactive, CPU 401 may control display device 404 to display the list of talkgroups 408 including indicators 411 indicating that each of talkgroups A, B, and D is active, as shown in FIG. 4. After S517, CPU 401 may return to S503 and begin another cycle of processes S503-S517 to determine if the active/inactive status of any of the talkgroups available to communication device 150 has changed. Accordingly, in particular implementations, S503-S517 may be continuously performed while communication device 150 is set to a scanning mode to continuously determine the active/inactive status of the talkgroups accessible to communication device 150. In other implementations, the process may proceed from S517 to S503 only after a triggering event occurs such as, for example, a selection on communication device 150 to refresh the information about the available talkgroups or after communication device 150 has cycled through all of the active talkgroups during one scanning cycle.

In some implementations, S505, S513, and S515 may be omitted. In particular, CPU 401 may receive information about all of the available talkgroups from control channel 0 in S503 and may simultaneously (e.g., in parallel) identify and mark all of the active and inactive talkgroups among the available talkgroups in S507, S509, and S511. Thereafter, CPU 401 may proceed to S517 and display the list of available talkgroups with information indicating which talkgroups are active or inactive.

In some implementations, control channel 0 may not include information about talkgroups accessible to communication device 150 for which traffic channels are not currently allocated. In such implementations, CPU 401 may receive information about only a subset of the talkgroups accessible to communication device 150 from control channel 0 in S503 (i.e., CPU 401 may receive information about only those talkgroups accessible to communication device 150 for which traffic channels currently are allocated). In such implementations, CPU 401 may determine in S507 that such talkgroups that are accessible to communication device 150 but for which no information is included in control channel 0 are inactive.

In some implementations, CPU 401 may begin performing S503-S517 without waiting for S501 to occur. For example, CPU 401 may begin performing S503 immediately after communication device 150 is powered on or awoken from a sleep or hibernation mode. Consequently, S503-S515 may run continuously in the background while communication device 150 is powered on and not in a sleep or hibernation mode, so that communication device 150 and a user thereof will be able to determine which talkgroups are active anytime when communication device 150 is active. In certain implementations, S517 may be omitted unless a user uses operation device 405 to request display device 404 to display the list of talkgroups 408 or indicators 411. Moreover, in particular implementations, information may be retrieved from control channel 0 each time a determination of active/inactive status is made in S507, such that information is retrieved from control channel 0 each time the status of a talkgroup is determined, rather than being retrieved once for every cycle through all of the available talkgroups.

FIG. 6 shows an example of a process of performing a dynamic scanning process. In S601, CPU 401 may receive an instruction to enter a scanning mode. Accordingly, the dynamic scanning process shown in FIG. 6 may be performed in parallel (e.g., simultaneously) with the process of using information from a control channel to determine which talkgroups that are accessible to a communication device 150 are active and which are inactive shown in FIG. 5. S601 may be the same process as S501 described above.

After receiving the instruction to enter the scanning mode, CPU 401 may set communication device 150 to a dedicated reception mode in S603. In S605, CPU 401 may determine whether any of the talkgroups accessible to communication device 150 are currently active. CPU 401 may make this determination based on the most recent information regarding the active/inactive status of the talkgroups accessible to communication device 150 stored in memory 402 (e.g., in S509 or S511). If CPU 401 determines that none of the talkgroups accessible to communication device 150 are currently active (S605: No), CPU 401 may continuously repeat S605 until one of the talkgroups becomes active. Alternatively, if CPU 401 determines that at least one of the talkgroups accessible to communication device 150 is currently active (S605: Yes), CPU 401 may proceed to S607 and set the talkgroup of communication device 150 to one of the active talkgroups (e.g., by connecting communication device 150 to the traffic channel assigned to the selected talkgroup).

CPU 401 may select the first active talkgroup to which communication device 150 is to be set based on one or more criteria. For example, CPU 401 may select the highest priority of the active talkgroups as the initial active talkgroup to which the communication device 150 is set. Higher priority talkgroups, for example, may be talkgroups within a set of talkgroups that are accessible to communication device 150 that have been defined as having a higher priority than other talkgroups that are accessible to communication device 150. For example, in a set of talkgroups accessible to a communication device 150 assigned to a municipal employee, certain talkgroups associated with emergency response or for receiving communications from important individuals may be defined as being higher priority than talkgroups associated with maintenance requests or custodial services. In another example implementation, CPU 401 may select the first active talkgroup listed in the list of talkgroups 408 (e.g., talkgroup A as illustrated in FIG. 4) as the active talkgroup to which communication device 150 is to be set.

After selecting one of the active talkgroups and setting that talkgroup as the talkgroup for communication device 150, communication device 150 may remain connected to the selected talkgroup for a predetermined period of time, thereby enabling a user of communication device 150 to listen to communications made via the talkgroup for the predetermined period. In some implementations, this predetermined period may be the same for all talkgroups. In other implementations, the length of the predetermined period may be based on characteristics of a particular talkgroup, such as, for example, the priority of the talkgroup or the relationship between the talkgroup and the user. For example, if the user is an emergency responder, the predetermined period may be longer for a talkgroup associated with a dispatcher than the predetermined period for a talkgroup associated with facilities services. Further, the predetermined period may be set by the user in some implementations.

In certain implementations, CPU 401 may set the talkgroup of a communication device 150 to a particular talkgroup in the manner shown in FIG. 3. For example, when CPU 401 sets talkgroup A as the talkgroup for communication device 150 in S301, CPU 401 may obtain information from control channel 0 that identifies which traffic channel is currently allocated to talkgroup A in S305. Thereafter, CPU 401 may tune communication device 150 to the identified traffic channel (e.g., frequency) and establish communication with talkgroup A (e.g., listen to talkgroup A) in S309. For example, if the information from control channel 0 indicates that traffic channel 1 is currently allocated to talkgroup A in S305, CPU 401 may tune communication device 150 to traffic channel 1 to establish communication with talkgroup A.

In S609, CPU 401 may determine whether the predetermined period of time has lapsed. If the predetermined period of time has not lapsed (S609: No), S609 may be performed continuously until the predetermined period of time has lapsed. If the predetermined period of time has lapsed (S609: Yes), CPU 401 may determine if any other talkgroups accessible to communication device 150 are currently active in S611. S611 may be substantially similar to S605, except that S611 may not take into consideration the currently set talkgroup. If CPU 401 determines that none of the other talkgroups accessible to communication device 150 are currently active (S611: No), CPU 401 may proceed to S613 and determine whether the currently set talkgroup is still active based on the most recent information regarding the active/inactive status of the talkgroups accessible to communication device 150 (e.g., stored in memory 402 in S509 or S511). If CPU 401 determines that the currently set talkgroup is still active (S613: Yes), CPU 401 may proceed to S615 and reset the predetermined time. Thereafter, CPU 401 may return to S609 and begin determining whether the reset predetermined time has lapsed. In this manner, communication device 150 may remain set to the only available active talkgroup.

If CPU 401 determines that the currently set talkgroup is no longer active (S613: No), CPU 401 may proceed to S617 and control display device 404 or I/O device 403 to provide the user with a notification indicating that no talkgroups accessible to communication device 150 are currently active. CPU 401 subsequently may return to S605 and periodically check to see if any of the talkgroups accessible to communication device 150 has become active.

Returning to S611, if CPU 401 determines that one or more of the other talkgroups accessible to communication device 150 are currently active (S611: Yes), CPU 401 may proceed to S619 and set the talkgroup of communication device 150 to one of the other active talkgroups. S619 may be substantially similar to S607. For example, referring to FIG. 4, CPU 401 may select talkgroup B because talkgroup B is the next active talkgroup included in the list of talkgroups 408. After selecting one of the other active talkgroups and setting that talkgroup as the talkgroup for communication device 150, communication device 150 may remain connected to the selected talkgroup for a predetermined period of time, thereby enabling a user of communication device 150 to listen to communications made via the talkgroup for the predetermined period of time.

Thereafter, CPU 401 may proceed to S621, in which CPU 401 may determine whether the predetermined period of time has lapsed. S621 may be substantially similar to S609. If the predetermined period of time has not lapsed (S621: No), S621 may be performed continuously until the predetermined period of time has lapsed. If the predetermined period of time has lapsed (S621: Yes), CPU 401 may return to S611 and determine if any other talkgroups accessible to communication device 150 are currently active and the dynamic scanning process may iteratively repeat until CPU 401 receives an instruction to exit scanning mode. In certain implementations of the process shown in FIG. 6, after all of the active talkgroups that are accessible to communication device 150 have been cycled through, CPU 401 may return to the first talkgroup set during the scanning process and start cycling through all of the active talkgroups that are accessible to communication device 150 yet again.

In particular implementations, a priority talk group may be established for communication device 150. When communication device 150 determines that the priority talkgroup is active (e.g., via information from control channel 0), the scanning process may be automatically interrupted, and CPU 401 may set communication device 150 to the priority talkgroup immediately, such that the user immediately is transitioned to listening to the priority talkgroup.

In some implementations, a user may turn off scanning mode and end the scanning process by making an affirmative selection of the talkgroup currently indicated by indicator 412 using operation device 405 and/or by requesting to enter the dedicated transmission mode within the talkgroup (e.g., by depressing a "talk" button). In such implementations, communication device 150 may remain in the currently selected talkgroup instead of continuing the dynamic scan of active talkgroups.

In certain implementations, the user may use operation device 405 to select particular talkgroups to include or ignore when performing a scanning process. When a particular talkgroup is not included in the group of talkgroups selected for scanning or is selected as a talkgroup to be excluded when performing the scanning process, the particular talkgroup may not be scanned during the scanning process (e.g., the particular talkgroup may not be considered at S605 and/or S611), and the communication device 150 may not be set to the particular talkgroup during the scanning process even if the control channel indicates that the particular talkgroup is active. Further, such an excluded or non-included talkgroup may not be displayed in the list of talkgroups 408 when communication device 150 is performing the scanning process. In some implementations, an excluded talkgroup may remain excluded only for the duration of the current period of active activity. In other words, after the excluded talkgroup transitions from active to inactive, the exclusion selection will disappear. Consequently, when the previously-excluded talkgroup becomes active again, the previously-excluded talkgroup may no longer be excluded from the scanning process unless the user again selects the previously-excluded talkgroup for exclusion.

In particular implementations, a user may specify (e.g., using instructions input via operation device 405) the predetermined time that communication device 150 spends monitoring a particular talkgroup during the scan process. The user may specify different predetermined times for different talkgroups. For example, referring to FIG. 4, the user may specify a waiting time of 5 seconds for talkgroup A and a waiting time of 30 seconds for talkgroup B. Consequently, during the scanning process, if talkgroups A and B both were active, communication device 150 would be set to talkgroup A for 5 seconds and would subsequently be set to talkgroup B for 30 seconds before being set to another talkgroup. In other implementations, the predetermined time spent monitoring a talkgroup during the scanning process may be based on a priority level of such talkgroup. For example, a higher-priority talkgroup, such as the priority talkgroup or the home talkgroup, may be associated with a longer monitoring time (e.g., 15 seconds) than the monitoring time associated with a lower-priority talkgroup (e.g., 5 seconds) during each iteration of a scan. Thus, communication device 150 may remain set to a higher-priority talkgroup for a longer period of time than communication device 150 remains set to a lower-priority talkgroup during the scanning process. Higher-priority talkgroups (e.g., talkgroups for emergency response or for communication from important individuals in an organization) may be more important to particular users or to organizations managing talkgroups than lower-priority talkgroups (e.g., talkgroups for maintenance requests or custodial services). In some implementations, users may set the priority of certain talkgroups or may rank the importance of talkgroups.

In some implementations, CPU 401 may also determine whether a currently set talkgroup is still active when making the determinations regarding time in S609 and S621. In some implementations, for example, CPU 401 may monitor the elapsed time since the most-recent active communication on the talkgroup (e.g., since a member of the talkgroup was in the dedicated transmission mode within the talkgroup) and may determine that the currently set talkgroup is no longer active if there has not been an active communication on the talkgroup for a predetermined period of time (e.g., 10 seconds). In other implementations, for example, CPU 401 may continue obtaining information from control channel 0 and may determine that the currently set talkgroup is no longer active if the information from control channel 0 indicates that no traffic channels are currently allocated to the currently set talkgroup or that no traffic channels are currently allocated to the currently set talkgroup for at least a particular period of time (e.g., 10 seconds). Accordingly, if a talkgroup becomes inactive while communication device 150 is currently set to that talkgroup during a scanning process, CPU 401 may act to set communication device 150 to a different talkgroup without waiting the entirety of the predetermined period. This may further reduce the amount of resources wasted monitoring an inactive talkgroup and further improve the efficiency of the systems disclosed herein.

In certain implementations, the user may be provided with an option to extend the predetermined time that communication device 150 remains set to a particular talkgroup during the scanning process. For example, when CPU 401 makes a positive determination in S609 or S621, CPU 401 may generate a prompt to the user (e.g., displayed on display 404) that asks the user if the user wants to further listen to the currently set talkgroup. If the user provides input to communication device 150 indicating an affirmative answer, the predetermined time may be restarted or another time period for remaining set to the current talkgroup, such as an extra minute or twice the original amount of time, may be selected for the current talkgroup, for example.

In certain implementations, communication device 150 may perform the processes of FIGS. 5 and 6 with respect to traffic channels instead of talkgroups.

Application of techniques disclosed herein may result in reducing time and user-resources wasted while monitoring inactive talkgroups by skipping inactive talkgroups during the scanning process; allowing users to quickly determine which talkgroups are active based on visual inspection; and/or allowing users to quickly switch between talkgroups by selecting from active talkgroups.

The flowcharts and block diagrams in FIGS. 1-6 illustrate examples of the architecture, functionality, and operation of possible implementations of systems, methods and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to include the plural forms as well, unless the context clearly indicates otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. Moreover, as used herein, the term "user" is intended to refer to one or more of a person, an organization, a computer, or any other entity, apparatus, device, or system.

Furthermore, the terms "communication device," "communication system," "device," and "system" may generally refer to and include satellites 110, satellite links 115, operation hubs 130, devices or systems connected with clouds 140, devices 120, gateways 135, communication devices 150, or any other devices or systems that facilitate the communication of information. Moreover, the terms "management center," "management device," and "management system" may generally refer to and include satellites 110, satellite links 115, operation hubs 130, devices or systems connected with clouds 140, devices 120, gateways 135, communication devices 150, or any other devices or systems that facilitate managing the communication of information.

While the techniques and implementations disclosed herein have generally been described in the context of satellite-based PTT communication, such techniques and implementations may readily be applied to other communication systems. For example, the techniques and implementations disclosed herein may be applied to cellular-based PTT communication systems, other terrestrial-based PTT communication systems, land mobile radio ("LMR") communication systems, hybrid communication systems using one or more of the communication systems described herein or apparent to one of skill in the art, or any other communication systems conceivable by one of skill in the art.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to explain the principles of the disclosure and the practical application, and to enable others of ordinary skill in the art to understand the disclosure with various modifications as are suited to the particular use contemplated.

What is claimed is:

1. A method of operating a particular wireless communications terminal within a communications network that supports multiple talkgroups, wherein individual talkgroups enable wireless communications terminals configured for participating in corresponding ones of the individual talkgroups to exchange group communications with each other and wherein individual wireless communications terminals are configurable for participation in different subsets of the multiple talkgroups supported by the communications network, the method comprising:

configuring the particular wireless communications terminal for participation in a particular subset of the multiple talkgroups supported by the communications network such that, when the particular wireless communications terminal is participating in an individual one of the constituent talkgroups of the particular subset, the particular wireless communications terminal can send and receive group messages to and from other wireless communications terminals configured for and participating in the individual constituent talkgroup;

processing an instruction for the particular wireless communications terminal to enter a talkgroup scanning mode;

as a consequence of having processed the instruction for the particular wireless communications terminal to enter the talkgroup scanning mode:

identifying, from among the particular subset of talkgroups for which the particular wireless communications terminal is configured to participate, a currently active talkgroup, and joining the particular wireless communications terminal for participation in the identified currently active talkgroup such that the particular wireless communications terminal can send and receive group messages to and from other wireless communications terminals configured for and participating in the currently active talkgroup.

2. The method of claim 1 further comprising:
as a further consequence of having processed the instruction for the particular wireless communications terminal to enter the talkgroup scanning mode:
identifying, from among the particular subset of talkgroups for which the particular wireless communications terminal is configured to participate, another currently active talkgroup,
withdrawing the particular wireless communications terminal from participation in the currently active talkgroup, and
joining the particular wireless communications terminal for participation in the identified other currently active talkgroup such that the particular wireless communications terminal can send and receive group messages to and from other wireless communications terminals configured for and participating in the other currently active talkgroup.

3. The method of claim 1 wherein:
identifying, from among the particular subset of talkgroups for which the particular wireless communications terminal is configured to participate, a currently active talkgroup includes identifying, from among the particular subset of talkgroups for which the particular wireless communications terminal is configured to participate, several currently active talkgroups; and
joining the particular wireless communications terminal for participation in the identified currently active talkgroup such that the particular wireless communications terminal can send and receive group messages to and from other wireless communications terminals configured for and participating in the currently active talkgroup includes sequentially joining the particular wireless communications terminal for participation in each of the several currently active talkgroups such that the particular wireless communications terminal can send and receive group messages to and from other wireless communications terminals configured for and participating in the particular one of the several currently active talkgroups in which the particular wireless communications terminal is participating.

4. The method of claim 1 wherein identifying, from among the particular subset of talkgroups for which the particular wireless communications terminal is configured to participate, a currently active talkgroup includes:
determining that activity has occurred in one of the talkgroups within the particular subset of talkgroups within a defined period of time; and
identifying the talkgroup in which it was determined that activity has occurred within the defined period of time as the currently active talkgroup.

5. The method of claim 1 further comprising:
determining that activity has ceased in the currently active talkgroup; and
as a consequence of having determined that activity has ceased in the currently active talkgroup:
identifying, from among the particular subset of talkgroups for which the particular wireless communications terminal is configured to participate, another active talkgroup, and
joining the particular wireless communications terminal for participation in the other active talkgroup such that the particular wireless communications terminal can send and receive group messages to and from other wireless communications terminals configured for and participating in the other active talkgroup.

6. The method of claim 1 further comprising:
as a further consequence of having processed the instruction for the particular wireless communications terminal to enter the talkgroup scanning mode:
monitoring, while the particular wireless communications terminal is participating in the currently active talkgroup, other of the subset of talkgroups for which the particular wireless communications terminal is configured to participate, and
based on the monitoring, keeping track of which of the other talkgroups of the subset of talkgroups for which the particular wireless communications terminal is configured to participate also are currently active.

7. The method of claim 1 wherein joining the particular wireless communications terminal for participation in the identified currently active talkgroup such that the particular wireless communications terminal can send and receive group messages to and from other wireless communications terminals configured for and participating in the currently active talkgroup includes:
identifying a wireless communications channel assigned by the communications network as a channel for sending and receiving group messages to and from wireless communications terminals configured for and participating in the currently active talkgroup, and
setting the particular wireless communications terminal to the identified channel such that the particular wireless communications terminal can send and receive group messages to and from wireless communications terminals configured for and participating in the currently active talkgroup over the identified channel.

8. The method of claim 7 wherein:
identifying a wireless communications channel assigned by the communications network as a channel for sending and receiving group messages to and from wireless communications terminals configured for and participating in the currently active talkgroup includes identifying a frequency band assigned by the communications network as a frequency band for sending and receiving group messages to and from wireless communications terminals configured for and participating in the currently active talkgroup; and
setting the particular wireless communications terminal to the identified channel such that the particular wireless communications terminal can send and receive group messages to and from wireless communications terminals configured for and participating in the currently active talkgroup over the identified channel includes setting the particular wireless communications terminal to the identified frequency band such that the particular wireless communications terminal can send and receive group messages to and from wireless communications terminals configured for and participating in the currently active talkgroup in the identified frequency band.

9. The method of claim 1 wherein the communications network that supports multiple talkgroups is a satellite communications network that supports multiple talkgroups.

10. A wireless communications terminal for a communications network that supports multiple talkgroups, wherein individual talkgroups enable wireless communications terminals configured for participating in corresponding ones of the individual talkgroups to exchange group communications with each other and wherein individual wireless communications terminals may be configured for participation in different subsets of the multiple talkgroups supported by the communications network, the wireless communications terminal comprising:
- one or more processing elements; and
- machine-readable storage media storing instructions that, when executed by the one or more processing elements, cause the wireless communications terminal to:
  - configure the wireless communications terminal for participation in a particular subset of the multiple talkgroups supported by the communications network such that, when the wireless communications terminal is participating in an individual one of the constituent talkgroups of the particular subset, the wireless communications terminal can send and receive group messages to and from other wireless communications terminals configured for and participating in the individual constituent talkgroup;
  - process an instruction for the wireless communications terminal to enter a talkgroup scanning mode;
  - as a consequence of having processed the instruction for the wireless communications terminal to enter the talkgroup scanning mode:
    - identify, from among the particular subset of talkgroups for which the wireless communications terminal is configured to participate, a currently active talkgroup, and
    - join the wireless communications terminal for participation in the identified currently active talkgroup such that the wireless communications terminal can send and receive group messages to and from other wireless communications terminals configured for and participating in the currently active talkgroup.

11. The wireless communications terminal of claim 10 wherein:
- the instructions that, when executed by the one or more processing elements, cause the wireless communications terminal to identify, from among the particular subset of talkgroups for which the wireless communications terminal is configured to participate, a currently active talkgroup include instructions that, when executed by the one or more processing elements, cause the wireless communications terminal to identify, from among the particular subset of talkgroups for which the wireless communications terminal is configured to participate, several currently active talkgroups; and
- the instructions that, when executed by the one or more processing elements, cause the wireless communications terminal to join the wireless communications terminal for participation in the identified currently active talkgroup such that the wireless communications terminal can send and receive group messages to and from other wireless communications terminals configured for and participating in the currently active talkgroup include instructions that, when executed by the one or more processing elements, cause the wireless communications terminal to sequentially join the wireless communications terminal for participation in each of the several currently active talkgroups such that the wireless communications terminal can send and receive group messages to and from other wireless communications terminals configured for and participating in the particular one of the several currently active talkgroups in which the wireless communications terminal is participating.

12. The wireless communications terminal of claim 10 wherein the machine-readable storage media further stores instructions that, when executed by the one or more processing elements, cause the wireless communications terminal to:
- determine that activity has ceased in the currently active talkgroup; and
- as a consequence of having determined that activity has ceased in the currently active talkgroup:
  - identify, from among the particular subset of talkgroups for which the wireless communications terminal is configured to participate, another active talkgroup, and
  - join the wireless communications terminal for participation in the other active talkgroup such that the wireless communications terminal can send and receive group messages to and from other wireless communications terminals configured for and participating in the other active talkgroup.

13. The wireless communications terminal of claim 10 wherein the machine readable storage media further stores instructions that, when executed by the one or more processing elements, cause the wireless communications terminal, as a further consequence of having processed the instruction for the wireless communications terminal to enter the talkgroup scanning mode, to:
- monitor, while the wireless communications terminal is participating in the currently active talkgroup, other of the subset of talkgroups for which the wireless communications terminal is configured to participate, and
- based on the monitoring, keep track of which of the other talkgroups of the subset of talkgroups for which the wireless communications terminal is configured to participate also are currently active.

14. The wireless communications terminal of claim 10 wherein the instructions that, when executed by the one or more processing elements, cause the wireless communications terminal to join the wireless communications terminal for participation in the identified currently active talkgroup such that the wireless communications terminal can send and receive group messages to and from other wireless communications terminals configured for and participating in the currently active talkgroup include instructions that, when executed by the one or more processing elements, cause the wireless communications terminal to:
- identify a wireless communications channel assigned by the communications network as a channel for sending and receiving group messages to and from wireless communications terminals configured for and participating in the currently active talkgroup, and
- set the wireless communications terminal to the identified channel such that the wireless communications terminal can send and receive group messages to and from wireless communications terminals configured for and participating in the currently active talkgroup over the identified channel.

15. The wireless communications terminal of claim 14 wherein:
- the instructions that, when executed by the one or more processing elements, cause the wireless communications terminal to identify a wireless communications channel assigned by the communications network as a channel for sending and receiving group messages to and from wireless communications terminals configured for and participating in the currently active talkgroup include instructions that, when executed by the one or more processing elements, cause the wireless communications terminal to identify a frequency band assigned by the communications network as a frequency band for sending and receiving group messages to and from wireless communications terminals configured for and participating in the currently active talkgroup; and the instructions that, when executed by the one or more processing elements, cause the wireless communications terminal to set the wireless communications terminal to the identified channel such that the wireless communications terminal can send and receive group messages to and from wireless communications terminals configured for and participating in the currently active talkgroup over the identified channel include instructions that, when executed by the one or more processing elements, cause the wireless communications terminal to set the wireless communications terminal to the identified frequency band such that the wireless communications terminal can send and receive group messages to and from wireless communications terminals configured for and participating in the currently active talkgroup in the identified frequency band.

16. Non-transitory machine readable storage media storing instructions that, when executed by one or more processing elements, cause the one or more processing elements to:

configure a wireless communications terminal for participation in a particular subset of multiple talkgroups supported by a communications network such that, when the wireless communications terminal is participating in an individual one of the constituent talkgroups of the particular subset, the wireless communications terminal can send and receive group messages to and from other wireless communications terminals configured for and participating in the individual constituent talkgroup, wherein individual ones of the talkgroups supported by the communications network enable wireless communications terminals configured for participating in corresponding ones of the individual talkgroups to exchange group communications with each other and wherein individual wireless communications terminals may be configured for participation in different subsets of the multiple talkgroups supported by the communications network;

process an instruction for the wireless communications terminal to enter a talkgroup scanning mode; as a consequence of having processed the instruction for the wireless communications terminal to enter the talkgroup scanning mode:

identify, from among the particular subset of talkgroups for which the wireless communications terminal is configured to participate, a currently active talkgroup, and join the wireless communications terminal for participation in the identified currently active talkgroup such that the wireless communications terminal can send and receive group messages to and from other wireless communications terminals configured for and participating in the currently active talkgroup.

17. The non-transitory machine-readable storage media of claim 16 wherein:

the instructions that, when executed by one or more processing elements, cause the one or more processing elements to identify, from among the particular subset of talkgroups for which the wireless communications terminal is configured to participate, a currently active talkgroup include instructions that, when executed by one or more processing elements, cause the one or more processing elements to identify, from among the particular subset of talkgroups for which the wireless communications terminal is configured to participate, several currently active talkgroups; and the instructions that, when executed by one or more processing elements, cause the one or more processing elements to join the wireless communications terminal for participation in the identified currently active talkgroup such that the wireless communications terminal can send and receive group messages to and from other wireless communications terminals configured for and participating in the currently active talkgroup include instructions that, when executed by one or more processing elements, cause the one or more processing elements to sequentially join the wireless communications terminal for participation in each of the several currently active talkgroups such that the wireless communications terminal can send and receive group messages to and from other wireless communications terminals configured for and participating in the particular one of the several currently active talkgroups in which the wireless communications terminal is participating.

18. The non-transitory machine-readable storage media of claim 16 further storing instructions that, when executed by one or more processing elements, cause the one or more processing elements to:

determine that activity has ceased in the currently active talkgroup; and as a consequence of having determined that activity has ceased in the currently active talkgroup: identify, from among the particular subset of talkgroups for which the wireless communications terminal is configured to participate, another active talkgroup, and join the wireless communications terminal for participation in the other active talkgroup such that the wireless communications terminal can send and receive group messages to and from other wireless communications terminals configured for and participating in the other active talkgroup.

19. The non-transitory machine readable storage media of claim 16 further storing instructions that, when executed by one or more processing elements, cause the one or more processing elements, as a further consequence of having processed the instruction for the wireless communications terminal to enter the talkgroup scanning mode, to:

monitor, while the wireless communications terminal is participating in the currently active talkgroup, other of the subset of talkgroups for which the wireless communications terminal is configured to participate, and based on the monitoring, keep track of which of the other talkgroups of the subset of talkgroups for which the wireless communications terminal is configured to participate also are currently active.

20. The non-transitory machine readable storage media of claim 16 wherein the instructions that, when executed by one or more processing elements, cause the one or more processing elements to join the wireless communications terminal for participation in the identified currently active talkgroup such that the wireless communications terminal can send and receive group messages to and from other wireless communications terminals configured for and participating in the currently active talkgroup include instructions that, when executed by one or more processing elements, cause the one or more processing elements to:

identify a wireless communications channel assigned by the communications network as a channel for sending and receiving group messages to and from wireless communications terminals configured for and participating in the currently active talkgroup, and set the wireless communications terminal to the identified channel such that the wireless communications terminal can send and receive group messages to and from wireless communications terminals configured for and participating in the currently active talkgroup over the identified channel.

21. The non-transitory machine-readable storage media of claim 20 wherein:

the instructions that, when executed by one or more processing elements, cause the one or more processing elements to identify a wireless communications channel assigned by the communications network as a channel for sending and receiving group messages to and from wireless communications terminals configured for and participating in the currently active talkgroup include instructions that, when executed by one or more processing elements, cause the one or more processing elements to identify a frequency band assigned by the communications network as a frequency band for sending and receiving group messages to and from wireless communications terminals configured for and participating in the currently active talkgroup; and the instructions that, when executed by one or more processing elements, cause the one or more processing elements to set the wireless communications terminal to the identified channel such that the wireless communications terminal can send and receive group messages to and from wireless communications terminals configured for and participating in the currently active talkgroup over the identified channel include instructions that, when executed by one or more processing elements, cause the one or more processing elements to set the wireless communications terminal to the identified frequency band such that the wireless communications terminal can send and receive group messages to and from wireless communications terminals configured for and participating in the currently active talkgroup in the identified frequency band.

22. A method of operating a wireless communications terminal within a communications network that supports multiple talkgroups, wherein individual talkgroups enable wireless communications terminals configured for participating in corresponding ones of the individual talkgroups to exchange group communications with each other and wherein individual wireless communications terminals are configurable for participation in different subsets of the multiple talkgroups supported by the communications network, the method comprising: configuring the wireless communications terminal for participation in a particular subset of the multiple talkgroups supported by the communications network such that, when the wireless communications terminal is participating in an individual one of the constituent talkgroups of the particular subset, the wireless communications terminal can send and receive group messages to and from other wireless communications terminals configured for and participating in the individual constituent talkgroup; identifying, from among the particular subset of talkgroups for which the wireless communications terminal is configured to participate, a group of one or more currently active talkgroups; and causing a display portion of the wireless communications terminal to generate a visual display that identifies one or more of the talkgroups of the group as currently active.

23. A wireless communications terminal for a communications network that supports multiple talkgroups, wherein individual talkgroups enable wireless communications terminals configured for participating in corresponding ones of the individual talkgroups to exchange group communications with each other and wherein individual wireless communications terminals may be configured for participation in different subsets of the multiple talkgroups supported by the communications network, the wireless communications terminal comprising: one or more processing elements; and machine-readable storage media storing instructions that, when executed by the one or more processing elements, cause the wireless communications terminal to: configure the wireless communications terminal for participation in a particular subset of the multiple talkgroups supported by the communications network such that, when the wireless communications terminal is participating in an individual one of the constituent talkgroups of the particular subset, the wireless communications terminal can send and receive group messages to and from other wireless communications terminals configured for and participating in the individual constituent talkgroup; identify, from among the particular subset of talkgroups for which the wireless communications terminal is configured to participate, a group of one or more currently active talkgroups; and cause a display portion of the wireless communications terminal to generate a visual display that identifies one or more of the talkgroups of the group as currently active.

24. Non-transitory machine readable storage media storing instructions that, when executed by one or more processing elements, cause the one or more processing elements to: configure a wireless communications terminal for participation in a particular subset of multiple talkgroups supported by a communications network such that, when the wireless communications terminal is participating in an individual one of the constituent talkgroups of the particular subset, the wireless communications terminal can send and receive group messages to and from other wireless communications terminals configured for and participating in the individual constituent talkgroup, wherein individual ones of the talkgroups supported by the communications network enable wireless communications terminals configured for participating in corresponding ones of the individual talkgroups to exchange group communications with each other and wherein individual wireless communications terminals may be configured for participation in different subsets of the multiple talkgroups supported by the communications network; identify, from among the particular subset of talkgroups for which the wireless communications terminal is configured to participate, a group of one or more currently active talkgroups; and cause a display portion of the wireless communications terminal to generate a visual display that identifies one or more of the talkgroups of the group as currently active.

* * * * *